(12) United States Patent
Bernaert et al.

(10) Patent No.: US 8,501,256 B2
(45) Date of Patent: Aug. 6, 2013

(54) METHOD FOR PROCESSING COCOA BEANS

(75) Inventors: Herwig Bernaert, Lebbeke-Wieze (BE); Nicholas Camu, Lebbeke-Wieze (BE); Tobias Lochmueller, Lebbeke-Wieze (BE)

(73) Assignee: Barry Callebaut AG, Zurich (CH)

( * ) Notice: Subject to any disclaimer, the term of this patent is extended or adjusted under 35 U.S.C. 154(b) by 222 days.

(21) Appl. No.: 12/992,656

(22) PCT Filed: May 13, 2009

(86) PCT No.: PCT/EP2009/055752
§ 371 (c)(1),
(2), (4) Date: Nov. 15, 2010

(87) PCT Pub. No.: WO2009/138418
PCT Pub. Date: Nov. 19, 2009

(65) Prior Publication Data
US 2011/0064849 A1     Mar. 17, 2011

(30) Foreign Application Priority Data

| | | |
|---|---|---|
| May 15, 2008 | (EP) | 08156260 |
| May 15, 2008 | (EP) | 08156268 |
| May 15, 2008 | (EP) | 08156275 |
| Sep. 26, 2008 | (EP) | 08156260 |
| Sep. 26, 2008 | (EP) | 08165256 |

(51) Int. Cl.
*A23G 1/00* (2006.01)

(52) U.S. Cl.
USPC ................... 426/241; 426/631; 426/237

(58) Field of Classification Search
USPC .............................. 426/241, 631
See application file for complete search history.

(56) References Cited

U.S. PATENT DOCUMENTS

| | | | |
|---|---|---|---|
| 5,026,482 A | 6/1991 | Sircar | |
| 5,342,632 A | 8/1994 | Bangerter et al. | |
| 5,888,563 A * | 3/1999 | Mehansho et al. | 426/72 |
| 8,048,469 B2 * | 11/2011 | Bradbury et al. | 426/631 |
| 2002/0034579 A1 | 3/2002 | Biehl et al. | |
| 2005/0031762 A1 | 2/2005 | McCarthy et al. | |
| 2008/0193595 A1 | 8/2008 | De Vuyst et al. | |
| 2011/0070332 A1 | 3/2011 | Bernaert et al. | |
| 2011/0123675 A1 | 5/2011 | Bernaert et al. | |

FOREIGN PATENT DOCUMENTS

| | | | |
|---|---|---|---|
| CH | EP1346640 | * | 3/2002 |
| GB | 2059243 | * | 9/1979 |
| WO | WO 97/33484 | | 9/1997 |
| WO | WO 2007031186 | | 3/2007 |

OTHER PUBLICATIONS

Kim, H. and Keeney, P. G. 1984. Journal of Food Science 49:1090.*
Brito, E. S et al. 2000. J. Science Food Agric 81:281.*
Chaytor, J. P. 1975. J. Science Food Agric. 26:593.*
Stark, T. 2006. J. Agric. Food Chem 54:5530.*
Takyi, E. et al. 1979. J. Agric. Food Chem 27(5)979.*
Misnawi, J.L., et al., "Activation of Remaining Key Enzymes in Dried Under-Fermented Cocoa Beans and Its Effect on Aroma Precursor Formation", Food Chemistry, vol. 78, No. 4, pp. 407-417, Sep. 1, 2002, Elsevier Science Publishers Ltd., Great Britain.
Samah, O.A., et al., "Effect of Shortened Fermentation Time on Acid Development and Sugar Metabolism of Cocoa Beans", Acta Alimentaria, Akademiai Krado, vol. 21, Nos. 3-4, pp. 285-291, Jan. 1, 1992, Budapest, Hungary. (Abstract Only).
Samah, O.A., et al., "Fermentation Products in Cocoa Beans Inoculated with *Acetobacter xylinum*" Asean Food Journal, Asean Food Handling Bureau, vol. 8, No. 1, Jan. 1, 1993, pp. 22-25, Kuala Lumpur, Malaysia.
Tomlins, K.I., et al., "Effect of Fermentation and Drying Practices on the Chemical and Physical Profiles of Ghana Cocoa", Food Chemistry, vol. 46, No. 3, pp. 253-263, Jan. 1, 1993, Elsevier Science Publishers Ltd., Great Britain.
Engler, M., et al., "The Vascularprotective Effects of Flavonoid-Rich Cocoa and Chocolate", (2004), Nutrition Research, vol. 24, pp. 695-706.
Levanon, Y., et al., "A Laboratory Study of Farm Processing of Cocoa Beans for Indsutrial Use", vol. 30, Issue 4, (Jul. 1965), Journal of Food Science, pp. 719-722.
Reineccius, G. A., et al., "Identification and Quantification of the Free Sugars in Cocoa Beans", J. Agr. Food Chem., vol. 20, No. 2, (1972), pp. 199-202.

* cited by examiner

*Primary Examiner* — Carolyn Paden
(74) *Attorney, Agent, or Firm* — Hoxie & Associates LLC

(57) ABSTRACT

The invention relates to a method for processing cocoa beans wherein freshly harvested, unfermented, and preferably non-depulped, beans are pre-treated and are then immersed a first time within an aqueous acidic medium until the pH of said cocoa beans reaches a value of between 3.6 and 5.5 and incubated at a temperature of between 25 and 70° C. for less than 24 hours. Optionally the beans can then be immersed for a second time within an aqueous acidic medium or the first aqueous acidic medium can be alkalified until the pH of said cocoa beans reaches a value of between 4.5 and 6.5 and incubated at a temperature of between 25 and 70° C. for less than 24 hours. The obtained cocoa beans are then further dried. The invention also relates to cocoa beans that are obtained or obtainable by methods of the present invention, to the use thereof for preparing food products, preferably chocolate products, or cocoa products, including cocoa extracts, and to food products and cocoa products, including cocoa extracts thereby obtained.

22 Claims, 6 Drawing Sheets

METHOD FOR PROCESSING COCOA BEANS

CROSS REFERENCE TO RELATED APPLICATIONS

This application is a United States National Stage Application under 35 USC §371 of PCT/EP2009/055752, filed May 13, 2009, which claims the benefit of EP 08156260.5, filed May 15, 2008, EP 08156268.8, filed May 15, 2008, EP 08156275.3, Filed May 15, 2008, EP 08165260.4 filed Sep. 26, 2008, and EP 8165256.2, filed Sep. 26, 2008, the contents of each of which are incorporated herein by reference.

TECHNICAL FIELD

The present invention relates to a method for processing freshly harvested, unfermented and preferably non-depulped, cocoa beans. The present invention advantageously provides a method for processing cocoa beans as an alternative to a conventional fermentation process. The present invention relates to a method for bioconverting cocoa beans comprising the step of pre-treating the cocoa beans and subsequently subjecting said pre-treated cocoa beans to a bioconversion process. The pre-treatment of said cocoa beans permits to open the testa of at least a part of said cocoa beans and to improve a subsequent processing of the pre-treated beans. The pre-treatment of said cocoa beans also permits to inhibit the germination of a predominant part of said cocoa beans and to improve a subsequent processing of the pre-treated beans. The invention further relates to cocoa beans obtained or obtainable by carrying out the methods of the present invention and uses thereof for preparing cocoa products, including cocoa extracts, and/or food products. The invention further relates to cocoa products, including cocoa extracts, and uses thereof for preparing food products. The invention also relates to food products prepared with cocoa beans and/or cocoa products as defined herein.

BACKGROUND

Cocoa beans are the principal raw material for chocolate production. These beans are derived from the fruit pods of the tree *Theobroma cacao*, which is cultivated in plantations in the equatorial zone, e.g., in Ivory Coast, Ghana, and Indonesia. The cocoa beans are embedded in a mucilaginous pulp inside the pods. Raw cocoa beans have an astringent, unpleasant taste and flavour, and have to be microbially fermented, dried, and roasted to obtain the desired characteristic cocoa flavour and taste. Chocolate flavour is influenced by the origin of the cocoa beans, the cocoa cultivars, the on-the-farm fermentation and drying process, and the roasting and further processing performed by the chocolate manufacturer.

After removal of the beans from the pods, the first step in cocoa processing for e.g. for the cocoa variety forastero is a spontaneous 6 to 10-day fermentation of beans and pulp in heaps, boxes, baskets, or trays. However, the spontaneous cocoa fermentation process is very inhomogeneous and suffers from great variations in both microbial counts and species composition, hence metabolites and start of bean fermentation. The variations seem to depend on many factors including country, farm, pod ripeness, post-harvest pod age and storage, pod diseases, type of cocoa, variations in pulp/bean ratio, the fermentation method, size of the batch, season and weather conditions, the turning frequency or no turning, the fermentation time, etc. which makes reproducibility of fermentation particularly difficult.

Drying of fermented beans may for instance comprise artificial drying in a current of hot-air or by spreading out the cocoa beans in the sun to dry. The roasting step involves Maillard reactions between reducing sugars and hydrolysis products of proteins, especially peptides and free amino acids. Unfortunately, the conditions for drying and roasting are not always adequately controlled. In addition, dried cocoa beans can also be damaged during their transport to the countries specialized in the downstream processing of the beans. Industry must therefore address a wide variability in the composition of a batch of cocoa beans.

Fermentation is known in the art to be an important factor in flavour development in cocoa beans. Attempts have therefore been made in the prior art to control fermentation parameters. Also, attempts have been made in the prior art to prepare cocoa beans having a desired composition, flavour and/or organoleptic properties.

For instance, WO 2007/031186 discloses a method to regulate the fermentation of plant material consisting of cocoa beans and/or pulp by adding to said plant material specific bacterial cultures containing at least one lactic acid bacterium and/or at least one acetic acid bacterium at different times during the fermentation process.

For instance, US 2002/0034579 discloses a method to obtain flavour-reduced or low-flavour cocoa from unfermented cocoa beans. In this method, the harvested cocoa beans are liberated from the pulp surrounding them and are optionally dried. The disclosed method further comprises the incubation of the (un)dried unfermented beans in water, the subsequent treatment in an acid aqueous medium after which the treated beans are subjected to an oxidation treatment. However, this method suppresses the formation of flavour and hence low-flavour cocoa is obtained.

WO 97/33484 discloses a process for reducing the levels of acidity in fermented beans prior to drying of the beans. In order to improve and enhance cocoa flavour of such beans, fermented beans were at least partially deshelled prior to drying, e.g. by means of air drying or sun-drying. During drying, excess acids diffuse from the beans to the shells where they are lost either by evaporation or by microbial decomposition. However, in this method, the drying step must be sufficiently long to result in a reduction of the level of acidity in the beans. The temperature of the process cannot be risen too high in order not to affect enzyme activity, responsible for flavour improvements, in the beans.

However, fermentation parameters remain difficult to control in prior art methods and industry must therefore address a wide variability in the composition of a batch of processed cocoa beans. Also there remains a need in the art for further controlling fermentation processes of cocoa beans in order to obtain highly flavoured cocoa beans of good quality.

SUMMARY

The present invention provides a solution to at least some of the above-mentioned problems.

In particular, the invention provides a method for processing cocoa beans into cocoa products having a desired composition, flavour and/or organoleptic properties. In particular the invention provides high-flavoured cocoa beans by means of a simpler, faster, more controllable and reproducible process, resulting in a cocoa product having a controllable and well-defined composition. In addition, the present method has the advantage of providing high-flavoured cocoa beans having a well-defined composition without having to subject said beans to a microbial fermentation. The method developed by the Applicants allows controlling the processing of cocoa beans in great detail. The ability to control and steer the processing of and the flavor development in cocoa beans is of great economic importance for the chocolate industry.

In particular, the present invention is directed to a method for pre-treating unfermented cocoa beans, with or without pulp, in order to initiate and control testa opening and/or to inhibit germination of at least part of said cocoa beans, after which the pre-treated cocoa beans are further processed by means of a bioconversion process. The present invention thus provides a method involving controlled pre-treatment of unfermented cocoa beans followed by controlled processing by bioconversion of said pre-treated cocoa beans. The pre-treatment has the important advantage of normalization of the starting material. In addition, the Applicants have also surprisingly shown that pre-treatment of cocoa beans facilitates and speeds up subsequent bioconversion of the pre-treated cocoa beans.

In other words, the present invention is directed to a method for processing (also denoted herein as bioconverting) cocoa beans comprising pre-treating said cocoa beans with a non-chemical treatment followed by processing (bioconverting) the pre-treated beans.

In a first aspect, the invention relates to a method for processing cocoa beans comprising the steps of:
i) subjecting said cocoa beans to a mechanical pre-treatment and/or to a physical pre-treatment, and
ii) subjecting said pre-treated cocoa beans to at least one treatment with an aqueous acidic medium until the pH of said cocoa beans reaches a value of between 3.6 and 5.5, and preferably of between 4.0 and 5.5,
wherein the beans are incubated in step ii) at a temperature of between 25 and 70° C. for less than 24 hours.

The present processing method provides an alternative to a natural fermentation of cocoa beans. The present method provides a controlled immersion of the cocoa beans in an aqueous acidic medium, to lower the pH in the cocoa beans to a suitable value, followed by incubation of the acidified cocoa beans under controlled temperature conditions and for a defined period of time whereby flavour formation in the cocoa beans can be controlled and adjusted.

The Applicant has surprisingly shown that although the present invention does not involve the use of microbial fermentation of the cocoa beans, which is believed to be important for flavour development in cocoa beans, the present method permits to obtain highly-flavoured cocoa beans and products.

The present invention further has the important advantage of normalization of cocoa beans obtained with the present invention, facilitating and speeding up subsequent processing of the cocoa beans, e.g. their application in subsequent food processing.

In one embodiment, a method is provided wherein the cocoa beans treated in step i) are unfermented and non-depulped cocoa beans.

In a particular embodiment, steps i) and ii) of the present method are performed under aerobic conditions. In other words, the present method is performed under oxygenic atmosphere, i.e in the presence of oxygen. Unexpectedly, although the first days during a natural fermentation process are normally done under anaerobic conditions, it has now been shown that by applying a method according to the invention, there is no need to remove oxygen and/or to work under anaerobic conditions, and that even under aerobic conditions it is possible to provide in accordance with the present method cocoa beans of a good quality and flavor, and even with high amounts of polyphenols such as epicatechin (see further). This is particularly surprising, since it is expected that under normal oxygen conditions oxidation would take place, and this would reduce the amounts of polyphenols.

In another embodiment, a method is provided comprising the step of releasing polyphenols from said cocoa beans to said medium within two hours of subjecting said cocoa beans to step ii).

In yet another embodiment, a method is provided comprising inhibiting the germination of at least 80% of said cocoa beans within two hours of subjecting said cocoa beans to step i).

In a preferred embodiment said mechanical treatment is selected from the group comprising depulping, scoring, scraping, cracking, crushing, pressing, rubbing, centrifugation, cutting or perforation of the cocoa beans and any combinations thereof.

In another embodiment said physical treatment is selected from the group comprising a thermal treatment, a microwave treatment, a treatment under water-saturated conditions, an ultrasound treatment, an infra-red treatment, a laser treatment, a pressure treatment and any combinations thereof.

In an example, said physical treatment comprises subjecting said cocoa beans to a temperature lower than 15° C. for at least 1 minute. In another example, said physical treatment comprises subjecting said cocoa beans to a temperature of more than 100° C. for at least 1 minute. In another example, said physical treatment comprises subjecting said cocoa beans to a microwave radiation of 300 MHtz to 300 GHz for at least 1 minute. In yet another example said physical treatment comprises exposing said cocoa beans to infra-red radiation of a wavelength of between 750 nm and 1 mm for at least 1 minute.

In an embodiment, a method is provided wherein step ii) comprises the steps of:
a) immersing the pre-treated cocoa beans within an aqueous acidic medium until the pH of said cocoa beans reaches a value of between 4.0 and 5.5,
b) optionally removing the aqueous acidic medium of step a),
c) incubating the cocoa beans of step a) or of step b) at a temperature of between 25 and 70° C. for less than 24 hours, and
d) optionally washing the cocoa beans of step c).

In another embodiment, this method further comprises the step of drying the cocoa beans obtained in step c) or step d).

In another embodiment, the invention provides a method wherein step ii) comprises the steps of:
a) immersing said pre-treated cocoa beans within an aqueous acidic medium until the pH of said cocoa beans reaches a value of between 3.6 and 5.5,
b) optionally removing the aqueous acidic medium of step a),
c) incubating the cocoa beans of step a) or of step b) at a temperature of between 25 and 70° C. for less than 24 hours,
d) optionally washing the cocoa beans of step c),
e) immersing the cocoa beans of step c) or of step d) within an aqueous acidic medium or alkalifying the aqueous acidic medium of step a) until the pH of said cocoa beans reaches a value of between 4.5 and 6.5,
f) optionally removing the aqueous acidic medium of step e),
g) incubating the cocoa beans of step e) or of step f) at a temperature of between 25 and 70° C. for less than 24 hours,
h) optionally washing the cocoa beans of step g), and
i) optionally drying the cocoa beans of step g) or h).

Preferably, the aqueous acidic medium applied in step a) of the above methods is a solution having a pH lower than 5, and preferably having a pH lower than 4 or lower than 3. In an embodiment the invention provides a method wherein the cocoa beans are immersed in step a) in an aqueous acidic medium of at least 0.1 molar (M) containing acetic acid.

In another embodiment, the invention relates to a method wherein the aqueous acidic medium applied in step e) is a solution having a pH lower than 6.5, and for instance lower than 6.0. In another embodiment the invention provides a method wherein the cocoa beans are immersed in step e) in an aqueous acidic medium of at least 0.1 molar (M) containing acetic acid. In an example, the aqueous acidic medium applied in step e) is a buffer solution having a pH comprised between 5.5 and 6.5 and containing acetic acid.

In another embodiment, the invention provides a method wherein step c) comprises incubating the cocoa beans for less than 20 hours, and for instance for less than 18 hours, less than 16 hours, or less than 12 hours. In another embodiment, the invention provides a method wherein step c) comprises incubating the cocoa beans at a temperature which is higher than 40° C., and for instance between 41° C. and 45° C.

In yet another embodiment, the invention provides a method wherein step g) comprises incubating the cocoa beans for less than 16 hours, and for instance for less than 14 hours. Also, in another embodiment the invention provides a method wherein step g) comprises incubating the cocoa beans at a temperature which is lower than 50° C., and for instance lower than 45° C.

By carrying out a method according to the invention, cocoa beans can be easily and rapidly obtained, i.e. in less than 48 hours, which is considerably faster than when applying a conventional fermentation process. Moreover, the present method has the important advantage of providing cocoa beans that are reproducible. Also, the Applicants have shown that cocoa beans can be obtained that have an acceptable taste and quality without having to subject the cocoa beans to a microbial fermentation. This is rather surprising, since fermentation is generally accepted in the art as being an important factor in flavour development in cocoa beans.

Another important advantage of methods according to the invention, is that cocoa beans can be provided that are less contaminated with bacteria. This has the particular advantage of reducing the need to de-bacterize the beans before downstream processing of the beans. This feature further also allows to roast the obtained beans under less severe conditions, e.g. at lower roasting temperatures and during shorter roasting times, compared to conventionally fermented beans. Thus, the present method for processing cocoa beans greatly facilitates and speeds up downstream processing of cocoa beans as defined herein into cocoa products as defined herein.

Another particular beneficial aspect of the present method is that is permits to provide cocoa beans having elevated levels of bio-active compounds, i.e. compounds that may provide health effects. In particular, in another embodiment, the invention provides a method wherein the cocoa beans obtained in step ii) have an amount of components selected from the group comprising aroma compounds, aroma precursor, ester-precursors, free amino acid precursors, free amino acids, aromatic bioactive molecules, alkaloid compounds, sugars, carbohydrates, and enzymes which is at least 10% higher or at least 10% lower than the amount in the cocoa beans that have been subjected to a conventional fermentation process for at least two days.

In a second aspect, the invention relates to cocoa beans that have an amount of components that can be adjusted. By applying a method according to the invention high-flavoured cocoa products having a controllable, reproducible and adjustable composition are obtained. In particular, the invention relates to cocoa beans obtainable or obtained by a method according to the invention, having an amount of components selected from the group comprising aroma compounds, aroma precursor, ester-precursors, free amino acid precursors, free amino acids, aromatic bioactive molecules, alkaloid compounds, sugars, carbohydrates, and enzymes which is at least 10% higher or at least 10% lower than in fermented cocoa beans, i.e. beans that have been subjected to a conventional fermentation process for at least two days.

In a preferred embodiment, the invention relates to cocoa beans that are obtained or obtainable by a method according to the invention.

The invention provides in an embodiment, cocoa beans that are no longer able to germinate two hours, and for instance 20, 30, 40, 50, 60, 70, 80, 90, 100 minutes, after having been subjected to a mechanical and/or physical treatment.

In another embodiment, the invention provides cocoa beans having one or more of the following features.

In a particular embodiment the cocoa beans provided in accordance with the invention are non-roasted cocoa beans.

In an embodiment, the invention provides cocoa beans having an amount of theobromine which is higher or lower than a value between 10000 and 16000 μg/g cocoa beans. Theobromine has diuretic, stimulant and relaxing effects.

In an embodiment, the invention provides cocoa beans having an amount of phenylethylamine (PEA) which is higher or lower than an amount between 0.02-1.4 ppm. In a preferred embodiment, the invention provides cocoa beans having an amount of phenylethylamine which is higher than 5 ppm. Unexpectedly, the present invention permits to provide cocoa beans that have, in unroasted condition, particularly high amounts of phenylethylamine, and in particular higher than the amounts found in unroasted conventionally fermented beans. The elevated amounts of PEA provided in the present cocoa beans further advantageously permit to roast the present beans at lower temperatures and/or during shorter roasting times, since high levels can already been obtained in unroasted beans. Moreover, the PEA concentrations provided in the present cocoa beans are particularly beneficial, since PEA is an important component of cocoa products, that is capable of influencing mood and associated with a feeling of contentment.

In another embodiment, the invention also provides cocoa beans having an amount of Gamma-aminobutyric acid (GABA) which is higher than 500 ppm. The present invention permits to provide cocoa beans that have high amounts of GABA and in particular higher than the amounts found in conventionally fermented beans. The elevated GABA concentrations provided in the present cocoa beans are particularly beneficial, since GABA is also be an important component of cocoa materials that is capable of influencing mood, reducing anxiety and stress.

In another embodiment, the invention also provides cocoa beans having amounts of amino acids, which are higher than those found in cocoa beans that have been subjected to a conventional fermentation process for at least two days. In particular, the invention provides cocoa beans having an amount of phenylalanine (PHE) which is higher than 2500 ppm. In yet another embodiment, the invention relates to cocoa beans having an amount of alanine (ALA) which is higher than 1200 ppm. In another embodiment, the invention provides cocoa beans having an amount of tryptophan (TRP) which is higher than 350 ppm. The present cocoa beans are particularly beneficial, since these amino acids are known to have anti-stress effects and they are believed to be able to influence mood.

In yet another embodiment, the invention provides cocoa beans having an amount of polyphenols which is higher or lower than an amount between 2.5-4.5 wt %. In a preferred embodiment, cocoa beans having enhanced amounts of flavonoids, including flavanols such as e.g. epicatechin and catechin. In a particular embodiment, the invention provides cocoa beans having an amount of epicatechin which is higher than 10000 ppm are provided. The present cocoa beans are particularly beneficial, since flavonoids in general and epicatechin in particular are known to be antioxidants, and to improve heart health. Moreover, surprisingly the Applicants have even shown that by applying a method for processing cocoa beans according to the invention, the amount of this health-promoting flavanol epicatechin can be preserved almost completely, while in contrast during a spontaneous fermentation more than 80% thereof will usually be lost. This finding is surprising as methods as disclosed herein are carried out under normal oxygen conditions, which could be expected to cause oxidation of this compound. However, the Applicants have now shown that cocoa beans processed with a method as defined herein are able to retain high levels of flavonols, such as epicathecin, in the beans, in contrast to fermented beans, wherein such compounds will generally be degraded and lost.

In another aspect, the invention also relates to cocoa beans obtained or obtainable by carrying out the methods of the present invention and to uses thereof, e.g. for preparing cocoa products such as cocoa powder, cocoa extract, cocoa liquor, cocoa mass, cocoa butter and cocoa cake, and/or for preparing food products, such as chocolate products.

The invention further relates to a cocoa product selected from the group comprising cocoa powder, cocoa extract, cocoa liquor, cocoa mass, cocoa butter and cocoa cake, prepared with one or more cocoa beans according to the invention, and to uses thereof, e.g. for preparing food products such as chocolate products.

The invention further provides a food product, preferably a chocolate product, prepared with one or more cocoa beans and/or with one or more cocoa products according to the present invention and to various uses of such food product.

With the insight to better show the characteristics of the invention, some preferred embodiments and examples are described hereafter referring to the enclosed drawings.

DETAILED DESCRIPTION OF THE INVENTION

Method

Figure 1:
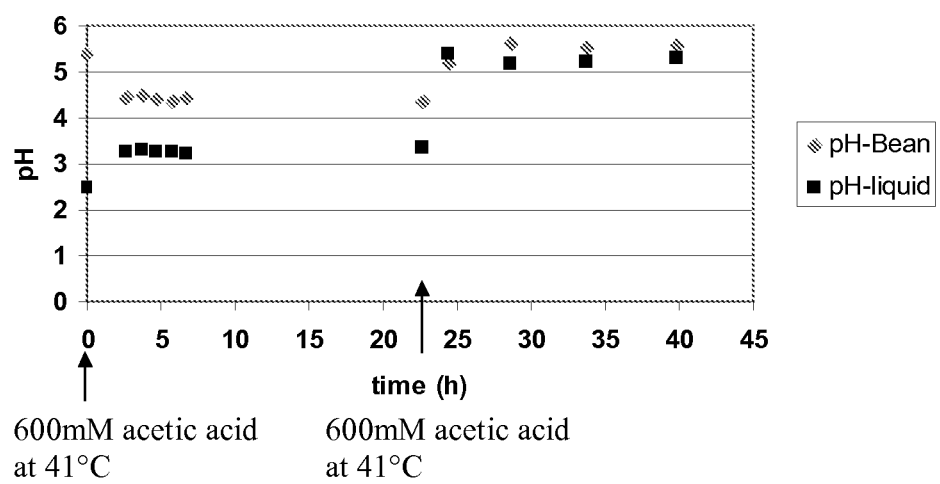
FIG. 1 shows the pH evolution in function of time of cocoa beans and liquids of an experiment carried out as described in example 1.

The present invention is directed to a method for processing unfermented cocoa beans. The present invention is in particular directed to a method for pre-treating cocoa beans subsequently followed by bioconverting said pre-treated cocoa beans. Preferably said beans are unfermented cocoa beans.

In particular, the present invention is directed to a method for bioconverting cocoa beans comprising pre-treating said cocoa beans with a non-chemical treatment followed by bioconverting the pre-treated beans. The term "non-chemical" pre-treatment in this context is used to indicate that the cocoa beans are not subjected or immersed in an aqueous acidic medium (as defined herein) prior to being bioconverted.

While the present invention primarily relates to the processing of the cocoa beans of the major cocoa plant species, *Theobroma cacao*, the invention is not limited solely to this species and further includes the subspecies *T. cacao cacao* and *T. cacao sphaerocarpum*. For example, many cocoa varieties are hybrids between different species; an example of such a hybrid is the trinitario variety. In accordance with the present invention cocoa beans obtained from various varieties such as Criollo, Forastero or Trinitario may therefore be used.

The term "cocoa beans" as used herein is intended to refer to cocoa beans or cocoa seeds as such as well as parts thereof and includes cocoa nibs.

Cocoa beans basically consist of two parts: an outer part comprising the testa or seed coat surrounding the bean, and an inner part comprising two cotyledons and the embryo or germ contained within the testa. In the present specification, the terms "testa" or "shelf" or "seed coal" are used as synonyms.

In accordance with the present method unfermented cocoa beans, with or without pulp can be pre-treated; e.g. in order to initiate testa opening of at least part of said cocoa beans. In this context, the term "unfermented" cocoa beans used herein is intended to refer to cocoa beans that have been liberated from cocoa pods and that have not yet germinated.

In contrast, the term "fermented cocoa beans" intends to include cocoa beans that have undergone a conventional fermentation process, i.e. while surrounded by their pulp. In particular, "fermented cocoa beans" as used herein refers to cocoa beans that have been fermented for at least two days. The term "fermentation" therefore refers to a fermentation process according to techniques known in the prior art and for a duration of at least two days.

In one embodiment, cocoa beans used as starting material in the present method are "non-depulped" cocoa beans, in other words, beans that have not been liberated from their pulp. The cocoa beans used as starting material can therefore be cocoa beans as they occur after removal from the pods.

In another embodiment, cocoa beans used as starting material in the present method are "depulped" cocoa beans. The term "depulped" cocoa beans refers to cocoa beans that have been essentially liberated from their pulp. Preferably "essentially liberated" refers to the removal from the cocoa beans of more than 60%, preferably more than 65, 70, 75, 80, 85, 90, 95, 97, or 99% by weight of pulp based upon the original total combined weight of beans and pulp.

The term "bioconverted" or "bioconverting" as used herein refers to the treatment of cocoa beans as an alternative to a natural fermentation of cocoa beans. Bioconversion involves controlled immersion(s) of cocoa beans in at least one aqueous acidic medium, to alter the pH in the cocoa beans, preferably under controlled temperature conditions. The terms "bioconverting" and "processing" may be used herein as synonyms.

The term aqueous acidic medium in this context is intended to refer to an aqueous medium that has a pH lower than 7, lower than 5, lower than 4, lower than 3, and for instance a pH of 2.6; 3.0; 4.0; 4.5; 5.0; 5.5; 6.0; or 6.5.

In particular, the invention provides a method for bioconverting cocoa beans wherein the step i) of pre-treating cocoa beans as will be elaborated below is followed by the step ii) of subjecting said pre-treated cocoa beans to at least one treatment with an aqueous acidic medium, and simultaneously or subsequently incubating said acid-treated beans at a temperature of between 25 and 70° C., preferably for less than 24 hours.

The pre-treatment of cocoa beans according to the present invention has the effect of initiating the opening of the testa of the cocoa beans. The term "testa opening" as used herein refers either to the damaging of the testa of cocoa beans, e.g. to obtain testa showing cracks or bursts, but also to a partial or complete removal of the testa from the cocoa beans. In some cases it may be desirable to fully remove the testa of the cocoa beans. However, there is also evidence of flavor improvement if the testa is simply burst or damaged to provide an exposed surface of the cocoa nib. "Initiation" of testa opening is intended to coincide with the start of the pre-treatment applied on the cocoa beans to obtain testa opening.

In another preferred embodiment, the present invention therefore provides a method wherein the pre-treatment involves opening the testa of at least 50% and preferably of at least 60, 70, 80 or 90% of the pre-treated cocoa beans.

Opening of the testa can be measured in different ways. One way consists of measuring a change in pH in the cocoa beans. This can be done by collecting cocoa beans, producing cocoa nibs, bringing said nibs in water and boiling the water containing the beans for 3, more preferably for 5 minutes at 100° C. The water containing the nibs is then filtrated and the pH of the filtrate is measured.

Another way consists of carrying out diffusion measurements. For instance the amount (wt % or ppm) of components such as e.g. polyphenols that have been leaked out of the cocoa beans during a certain period of time can be measured. This can be done by placing X number of pre-treated cocoa beans for Y minutes in Z liters of water or another solvent at a certain temperature T (° C.). The Applicants indicate that when polyphenols can be detected in the medium surrounding the beans, testa opening has been initiated.

In another embodiment, the pre-treatment of cocoa beans according to the present invention has the effect of inhibiting germination of the cocoa beans. As is well known in the art, germination is the growth of an embryonic plant contained within a seed, it results in the formation of the seedling. The term "germination of cocoa beans (cocoa seeds)" as used herein refers to the sprouting of a cocoa seedling from a cocoa seed. "Inhibition" of germination as used in the present application is intended to refer to the effect of avoiding that germination of the cocoa seeds starts but also to the effect of ending (interrupting) germination of the cocoa seeds if germination already started. "Initiation" of the inhibition of germination in this context is intended to coincide with the start of the pre-treatment applied on the cocoa beans.

In another preferred embodiment, the present invention therefore provides a method wherein the pre-treatment involves the inhibition of at least 80% of said cocoa beans, and preferably of at least 85, 90, 95% or even up to 100% of the cocoa beans within two hours of subjecting said cocoa beans to the pre-treatment, and thus within two hours of initiating the pre-treatment.

Inhibition of germination can be measured by determining a germination rate by means of a germination assay. The germination rate is the number of cocoa seeds that germinate under proper conditions, and in particular, that germinate when growing the cocoa seeds on earth or cotton for 7 days at 25-31° C. under humidity saturated conditions. The germination rate is expressed as a percentage, e.g. an 15% germination rate indicates that about 15 out of 100 seeds germinate.

The present method for processing cocoa beans comprising the steps of:
  i) subjecting said cocoa beans to a mechanical treatment and/or to a physical treatment, and
  ii) subjecting said pre-treated cocoa beans to at least one treatment with an aqueous acidic medium until the pH of said cocoa beans reaches a value of between 3.6 and 5.5, wherein the beans are incubated in step ii) at a temperature of between 25 and 70° C. for less than 24 hours.

Preferably steps i) to ii) of said method are performed under aerobic conditions.

In an embodiment, the beans applied in step i) are unfermented beans. In another the beans applied in step i) may be depulped or non-depulped cocoa beans. Preferably the beans applied in step i) are unfermented and non-depulped cocoa beans.

The pH evolution in the cocoa beans can be followed by measuring the internal pH of the cocoa beans at regular intervals, as explained below.

In a particular embodiment, the present invention is directed to a method for bioconverting cocoa beans comprising the steps of:
  i) opening the testa of said cocoa beans by pre-treating said cocoa beans by means of a non-chemical treatment, and for instance by a mechanical treatment and/or a physical treatment, and
  ii) subjecting said pre-treated cocoa beans to at least one treatment with an aqueous acidic medium followed by incubating the cocoa beans at a temperature of between 25 and 70° C., preferably for less than for less than 24 hours.

In another particular embodiment, the present invention is directed to a method for bioconverting cocoa beans comprising the steps of:
  i) inhibiting germination of said cocoa beans by pre-treating said cocoa beans by means of a non-chemical treatment, and for instance by a mechanical treatment and/or a physical treatment, and
  ii) subjecting said pre-treated cocoa beans to at least one treatment with an aqueous acidic medium followed by incubating the cocoa beans at a temperature of between 25 and 70° C., preferably for less than for less than 24 hours.

The invention thus also provides a method wherein cocoa beans are pre-treated in such a way that within two hours of subsequently subjecting said pre-treated cocoa beans to step ii) detectable amount of polyphenols is released from said beans in the surrounding medium. The invention also relates to a method for pre-treating freshly harvested, unfermented, cocoa beans wherein at least of part of the pre-treated cocoa beans are no longer able to germinate, and wherein within two hours of said pre-treatment at least 80% of the cocoa beans can no longer germinate.

Pre-Treatments

The cocoa beans according to the invention are subjected to a pre-treatment before being immersed in at least one acidic medium. Various pre-treatments and combinations thereof may be applied in accordance with the present invention.

In a preferred embodiment, said mechanical treatment is selected from the group comprising depulping, scoring, scraping, cracking, crushing, pressing, rubbing, centrifugation, cutting or perforation of the cocoa beans and any combinations thereof.

In another preferred embodiment, said physical treatment is selected from the group comprising a thermal treatment, a microwave treatment, a treatment under water-saturated conditions, an ultrasound treatment, an infra-red treatment, a laser treatment, a pressure treatment and any combinations thereof.

In one example said physical treatment comprises subjecting said cocoa beans for at least 1 minute to a temperature lower than 15° C. or lower than 10° C. or lower than 0° C.

In another example said physical treatment comprises subjecting said cocoa beans to a temperature of more then 100° C. for at least 1 minute.

In another example said physical treatment comprises subjecting said cocoa beans to a microwave radiation of 300 MHtz to 300 GHz substantially homogeneous field for at least 1 minute.

In yet another example said physical treatment comprises exposing said cocoa beans to infra-red radiation of a wavelength of between 750 nm and 1 mm for at least 1 minute.

The Applicants have shown that by subjecting cocoa beans to a pre-treatment the uptake by the cocoa beans of the aqueous acidic medium applied in step ii) of the above method is greatly facilitated, e.g. diffusion of acids in the cocoa beans is accelerated, and as a consequence, the conversion of metabolites in the beans is improved and accelerated. In addition, the acid concentration used to treat the cocoa beans can be reduced, and/or washing of the cocoa beans after acid treatment—if done—is greatly facilitated, e.g. less washing is required or in case of washing less water needs to be percolated through the bioconverted cocoa beans.

Further, the present method allows to normalize (regulate, control) the starting time for the bioconversion process, and thus to regulate the bioconversion process, and to steer and influence taste development in the beans. Taste regulation becomes possible, i.e. the development of certain flavours can be influenced or selected (e.g. fruitiness), which results in a more homogeneous taste. This facilitates and improves (rapidity) the downstream processing of the cocoa beans, for instance by reducing conching time and lowering the need for cocoa blending.

In another embodiment the invention provides a method comprising the step of releasing polyphenols from said cocoa beans to said medium within two hours of subjecting said cocoa beans to step ii).

In particular, the present method permits to release a detectable amount of polyphenols from said cocoa beans to said medium within two hours of subjecting said cocoa beans to step ii). The term "detectable amount" in this context is used to refer to that amount that can significantly be detected when using appropriate detection equipment, such as e.g. equipment for carrying out HPLC or RHPLC analyses. Such detectable amount can be determined and measured by a person skilled in the art. In one example for instance, the method permits to release at least 0.01 mg/g (at least 10 ppm) of polyphenols from said cocoa beans within two hours of subjecting said cocoa beans to step ii).

Controlled pre-treatment followed by controlled bioconversion further results in beneficial effects on cocoa flavour development. The above-given pre-treatments have the beneficial effect of opening the testa of a predominant amount of treated cocoa beans, but surprisingly do not have a negative effect on the bioconversion, and on flavour production and development in the pre-treated cocoa beans. The present method thus also allows excellent flavour formation in the cocoa beans and permits to obtain highly-flavoured cocoa products having excellent organoleptic properties.

The invention also provides cocoa beans having an amount of polyphenols two hours after having been subjected to at least one treatment with an aqueous acidic medium followed by incubation of the cocoa beans at a temperature of between 25 and 70° C., which is lower than the total amount of polyphenols before being subjected to said treatment. In a preferred embodiment, cocoa beans having an amount of polyphenols two hours after having been subjected to at least one treatment with an aqueous acidic medium followed by incubation of the cocoa beans at a temperature of between 25 and 70° C., which is significantly lower than the total amount of polyphenols before being subjected to said treatment. The term "significantly lower" used in this context, intends to refer to that amount that significantly differs from the amount detected for cocoa beans before being subjected to the at least one treatment with an aqueous acidic medium. Such detectable amount can be determined and measured by a person skilled in the art when using appropriate detection equipment, such as e.g. equipment for carrying out HPLC or RHPLC analyses.

In another embodiment the invention provides a method comprising inhibiting the germination of at least 80%, and preferably at least 85%, 90%, 95%, and even up to 100% of said cocoa beans within two hours of subjecting said cocoa beans to step i).

The present invention thus provides methods involving controlled pre-treatment of unfermented cocoa beans followed by controlled processing by bioconversion, of said pre-treated cocoa beans. The pre-treatment has the important advantage of normalization of the starting material. In addition, the Applicants have also surprisingly shown that pre-treatment of cocoa beans facilitates and speeds up bioconversion of the pre-treated cocoa beans.

The Applicants also showed that by subjecting cocoa beans to a pre-treatment as described herein a predominant part of the treated cocoa beans lose the capacity to germinate. However, surprisingly, this loss of germination capacity has no significant effect on the capacity of the cocoa beans to undergo enzymatic activities and/or to undergo a conversion of aroma and other metabolites on the beans. Thus, surprisingly, the Applicants showed that a loss of germination capacity did not significantly affect the development of good flavour characteristics in the cocoa beans. On the contrary, the Applicants demonstrated that a controlled pre-treatment followed by controlled bioconversion results in beneficial effects on cocoa flavour development. Pre-treatment of the cocoa beans as defined herein significantly improves conversion of metabolites and precursors in the cocoa beans, improves the formation of aroma compounds, e.g. ester compounds and ester-precursors, free amino acid precursors, aromatic bioactive molecules, etc. The present method thus also allows excellent flavour formation in the cocoa beans and permits to obtain highly-flavoured cocoa products having excellent organoleptic properties. Unexpectedly, inhibition of germination of the cocoa beans permits to halter internal energy source consumption and to maintain the cocoa beans at a specific stage until the start of a subsequent bioconversion process.

In particular, the invention provides a method wherein the bioconverted cocoa beans have an amount of components selected from the group comprising aroma compounds, aroma precursors, ester-precursors, free amino acid precursors, aromatic bioactive molecules, alkaloid compounds, sugars, carbohydrates, and enzymes which is at least 10% higher or at least 10% lower than the amount in cocoa beans that have been subjected to a conventional fermentation process for at least two days.

Bioconversion

Following pre-treatment, the cocoa beans are bioconverted. In an optional embodiment the pre-treated cocoa beans are first washed after the pre-treatment before being subjected to the bioconversion process. Basically three different embodiments of methods for bioconverting cocoa beans are provided in accordance with the present invention; in particular:
- a method comprising one step of immersing pre-treated cocoa beans in an aqueous acidic medium;
- a method comprising two steps of immersing cocoa beans in an aqueous acidic medium, and
- a method comprising a step of immersing pre-treated cocoa beans in an aqueous acidic medium and a step of alkalifying the aqueous acidic medium used in a previous step.

These embodiments will be elaborated here after.

In a first embodiment a method for bioconverting cocoa beans is provided wherein the cocoa beans are subjected in step i) to a pre-treatment by means of a mechanical treatment and/or a physical treatment as defined above, and, in step ii) the pre-treated cocoa beans are treated by the steps of:
a) immersing the pre-treated cocoa beans within an aqueous acidic medium until the pH of said cocoa beans reaches a value of between 4.0 and 5.5,
b) optionally removing the aqueous acidic medium of step a),
c) incubating the cocoa beans of step a) or of step b) at a temperature of between 25 and 70° C. for less than 24 hours,
d) optionally washing the cocoa beans of step c).

The above embodiment of the method may further comprise the step of drying the cocoa beans obtained in step c) or step d).

In the immersion step of the bioconversion process immersion of the cocoa beans is executed until the pH of said cocoa beans reaches a value of between 4.0 and 5.5, and for instance a pH value of between 4.8 and 5.5 or between 5.0 and 5.5.

In a second embodiment a method for bioconverting cocoa beans is provided wherein the cocoa beans are subjected in step i) to a pre-treatment by means of a mechanical treatment and/or a physical treatment as defined above, and, in step ii) the pre-treated cocoa beans are treated by the steps of:
a) immersing said pre-treated cocoa beans within an aqueous acidic medium until the pH of said cocoa beans reaches a value of between 3.6 and 5.5,
b) optionally removing the aqueous acidic medium of step a),
c) incubating the cocoa beans of step b) at a temperature of between 25 and 70° C. for less than 24 hours,
d) optionally washing the cocoa beans of step c),
e) immersing the cocoa beans of step d) within an aqueous acidic medium until the pH of said cocoa beans reaches a value of between 4.5 and 6.5,
f) optionally removing the aqueous acidic medium of step e),
g) incubating the cocoa beans of step f) at a temperature of between 25 and 70° C. for less than 24 hours,
h) optionally washing the cocoa beans of step g), and
i) optionally drying the cocoa beans of step h).

In a first immersion step of this method (step a), immersion of the cocoa beans is executed until the pH of said cocoa beans reaches a value of between 3.6 and 5.5. In a preferred embodiment, said step comprises immersing the cocoa beans within an aqueous acidic medium until the pH of said cocoa beans reaches a pH value lower than 5.5 and for instance a pH of between 3.8 and 5.0 or between 4.0 and 4.8.

In a second immersion step of this method (step e) immersion of the cocoa beans is executed until the pH of said cocoa beans reaches a value of between 4.5 and 6.5. In a preferred embodiment, the present step comprises immersing the cocoa beans within an aqueous acidic medium until the pH of said cocoa beans reaches a pH value lower than 6.0 and for instance a pH of between 4.8 and 5.8 or between 5.0 and 5.5.

Optionally, after the first incubation the cocoa beans are not washed with water but directly immersed within said second aqueous acidic medium until the pH of the beans reaches a value of between 4.5 and 6.5. This will effect at least partial removal of acid from the beans.

In yet a third embodiment, a method for bioconverting cocoa beans is provided wherein the cocoa beans are subjected in step i) to a pre-treatment by means of a mechanical treatment and/or a physical treatment as defined above, and, in step ii) the pre-treated cocoa beans are treated by the steps of:
a) immersing said pre-treated cocoa beans within an aqueous acidic medium until the pH of said cocoa beans reaches a value of between 3.6 and 5.5,
b) optionally removing the aqueous acidic medium of step a),
c) incubating the cocoa beans of step b) at a temperature of between 25 and 70° C. for less than 24 hours,
d) optionally washing the cocoa beans of step c),
e) alkalifying the aqueous acidic medium of step a) until the pH of said cocoa beans reaches a value of between 4.5 and 6.5,
f) optionally removing the aqueous acidic medium of step e),
g) incubating the cocoa beans of step f) at a temperature of between 25 and 70° C. for less than 24 hours,
h) optionally washing the cocoa beans of step g), and
i) optionally drying the cocoa beans of step h).

Thus in this third embodiment of the present method for processing cocoa beans step e) involves the step of alkalifying the aqueous acidic medium of step a) until the pH of the cocoa beans reaches a value of between 4.5 and 6.5. Alkalifying the aqueous acidic medium in step e) can be done for instance by adding a base or a basic solution to the acidic medium of step a), e.g. a NaOH solution. This is further illustrated in example 3.

The following characteristics apply for any of the above disclosed bioconversion methods.

In accordance with any of the methods for bioconversion explained above, the cocoa beans applied in step a) of the above methods can be used just as they occur after the pre-treatment or they can first be dried.

If dried cocoa beans are used, such beans can be treated with water before further treatment. For this, the dried cocoa beans are incubated in water at a temperature of not more than 70° C., preferably 55° C. or less, particularly 45° C. or less, e.g. 40° C., until the original water content, e.g. approximately 30 to 35 wt %, has been essentially restored.

Alternatively, if dried cocoa beans are used they can immediately be immersed within an aqueous acidic medium until the pH of said cocoa beans reaches a suitable value, as indicated above in step a) of the above methods.

The different bioconversion methods explained above comprise immersing the cocoa beans in step a) of the methods and in step e) of the second method within an aqueous acidic medium at a temperature higher than 30° C. and preferably higher than 35° C. and for instance between 40 and 65° C.

The duration of step a) of the different methods and of step e) of the second or third method should be sufficiently long to bring about complete acid penetration of the cocoa beans. In another embodiment the method therefore comprises immersing the cocoa beans within an aqueous acidic medium for a time period of less than 40 hours, and for instance less than 35, 30, 25, 20, 15 hours.

An aqueous acidic medium used in the present method is a medium having a pH lower than 7, preferably lower than 5, more preferably lower than 3. Such aqueous acidic medium may comprise either inorganic or organic acids with preference for amphiphilic acids. When selecting the acids, it should be borne in mind that they should not impair the flavour of the cocoa beans but readily penetrate into the cocoa beans. Short-chain aliphatic monocarboxylic acids have proved especially suitable. Acid or acid buffer systems that can be used include acetic acid, ascorbic acid, citric acid, hydrochloric acid, phosphoric acid. Particularly good results were achieved using for instance acetic acid. It is assumed that acetic acid is especially suitable as it, due to its hydrophobic properties, can penetrate the high fatty components in the cocoa beans and pervade biological membranes when the concentration is sufficient.

In order to quickly change the pH in the cocoa beans by immersion in said acid solution, both the acid concentration in the medium and the quantitative ratio of acid in the medium to cocoa beans are important. The acid concentration in the medium should not drop critically during absorption of the acid into the cocoa beans, and the individual cocoa beans should be in free contact with the medium. For this purpose, an at least 0.1 molar (M) acid solution is preferably used as a medium, and use of a 0.2 to 0.6 M acid solution is particularly suitable. The quantitative ratio of cocoa beans (g dry matter) to the volume of medium (ml) should advantageously be comprised between 10:1 and 1:10, or between 1:5 and 5:1 and for instance be 1:4, 1:3, 1:2, 1:1, 2:1, 3:1, 4:1. Optionally, the cocoa beans' absorption of acid can be promoted by slight pre-drying of individual beans, or by mixing the cocoa beans and/or the medium.

Preferably, the aqueous acidic medium applied in step a) of the above methods is a solution having a pH lower than 5, and preferably having a pH lower than 4 or lower than 3. In a preferred embodiment, a method is provided wherein said aqueous acidic medium applied in step a) of the present methods is an acetic acid solution. Thus, a method is provided wherein said aqueous acidic medium applied in step a) is or contains an acetic acid solution. During natural fermentation processes, usually first a break down of citric acid will be seen in the cocoa pulp, after which production of organic acids, including acetic acid, is usually observed. Despite this teaching, the Applicants have now unexpectedly shown that even when using acetic acid, which in fact reflects the later stage of a natural fermentation process, during a first stage of the present method, cocoa beans can be obtained with a good quality and flavor. Thus, surprisingly, and contrary to prior art teachings, the application of the acetic acid during the (first) immersion step of the present method is adequate to obtain cocoa beans with a good quality and flavor.

In another embodiment, the aqueous acidic medium applied in step e) is a solution having a pH lower than 6.5, and for instance lower than 6.0. In a preferred embodiment the aqueous acidic medium applied in step e) is a buffer solution having a pH comprised between 5.5 and 6.5 and containing acetic acid.

After immersion of the cocoa beans within an aqueous acidic medium until the pH of said cocoa beans reaches a suitable value in step a) of the three methods and/or in step e) of the second or third method, the beans having the internal pH value as indicated are incubated at a temperature of between 25 and 70° C. and for instance of between 30 and 65° C. or between 40 and 55° C., and preferably for less than 24 hours, and for instance for 3, 5, 8, 10, 12, 15, 18, 20, 22 hours. During these incubation steps, enzymatic conversions take place within the beans whereby the formation of flavour precursors or flavour compounds are effectively stimulated.

For instance, in an example, the invention provides a method wherein step c) comprises incubating the cocoa beans for less than 20 hours, and for instance for less than 18 hours, less than 16 hours, or less than 12 hours. In another embodiment, the invention provides a method wherein step c) comprises incubating the cocoa beans at a temperature which is higher than 40° C., and for instance between 41° C. and 45° C.

In yet another embodiment, the invention provides a method wherein step g) comprises incubating the cocoa beans for less than 16 hours, and for instance for less than 14 hours. Also, in another embodiment the invention provides a method wherein step g) comprises incubating the cocoa beans at a temperature which is lower than 50° C., and for instance lower than 45° C.

Optionally, in a further embodiment, the aqueous acidic medium used in the immersion step is removed prior to the incubation of said cocoa beans under the above-indicated conditions.

In another optional embodiment, the cocoa beans are incubated during their immersion within the indicated media, than the media are moved and thereafter, the cocoa beans can be further incubated under the above-indicated conditions. In an example, beans are incubated in the immersion media at a temperature of between 25 and 50° C. and for less than 10 hours, and for instance at a temperature of between 30 and 45° C. for 2 to 4 hours. Thereafter the media are removed and the beans can be further incubated under the above-indicated conditions.

In yet another embodiment, after having been incubated the acid diffused into the cocoa beans and the acid concentration may be reduced. The acid can then be removed from the cocoa beans in various ways. For instance, for this purpose, the cocoa beans can be washed with water after incubation. This can be done by immersing the cocoa beans in water into which the acid diffuses from the cocoa beans. The water is changed many times to keep the acid concentration low. Alternatively, pure water is percolated through the batch of cocoa beans.

Alternatively, after the first incubation the cocoa beans are not washed with water but directly immersed within said second aqueous acidic medium until the pH of the beans reaches a value of between 4.5 and 6.5. This will also effect at least partial removal of acid from the beans.

After the first and second incubation steps, acid can be removed from the cocoa beans within preferably less than 24 hours.

According to another embodiment, cocoa beans that have been bioconverted according to methods as disclosed above can be dried or not. If they are dried, preferably, said drying is performed by means of conventional drying techniques such as e.g. sun, microwave hot air, commonly known in the art. Preferably, in such case the cocoa beans are dried until a moisture content of the mixture of less than 10%, especially until a moisture content of 9, 8, 7, 6, or 5%, is reached.

Cocoa Beans and Cocoa Products

In yet another aspect, the invention relates to cocoa beans that are obtained or obtainable by carrying out a method according to the invention.

The invention provides a method wherein the bioconverted cocoa beans have an amount of components selected from the group comprising aroma compounds, aroma precursor, ester-precursors, free amino acids, aromatic bioactive molecules, alkaloid compounds, sugars, carbohydrates, and enzymes which is at least 10% higher or at least 10% lower than the amount in cocoa beans that have been subjected to a conventional fermentation process for at least two days.

The term "conventional fermentation process" as used herein refers to a fermentation process according to techniques known in the prior art and for a duration of at least two days, and does not involve a pre-treatment of the cocoa beans as defined herein.

In addition, the invention relates to cocoa beans that have an amount of one or more components selected from the group comprising:
aroma compounds, such as sugar alcohols and esters;
aroma precursors, such as reduced sugars, pyrazines, amino acids, peptides;
compounds such as gamma-aminobutyric acid (GABA) or phenylethylamine (PEA);
free amino acids such as phenylalanine, tyrosine, alanine, tryptophan;
aromatic bioactive molecules such as polyphenols, linalol, anandamide, cycloartenol,
alkaloid compounds such as theobromine, caffeine,
polyphenols such as epicatechin, catechin;
sugars such as sucrose, fructose, saccharose;
enzymes such as proteases
sugar converting enzymes, such as invertase; and
carbohydrate converting enzymes, such as amylase;
which amount is in particular higher or lower than in fermented cocoa beans, and preferably at least 10, 15, 20, 25% higher or at least 10, 15, 20, 25% lower than in fermented cocoa beans.

The expression "fermented cocoa beans" in this context refers to cocoa beans that have undergone a conventional fermentation process, i.e. while surrounded by their pulp. In particular, "fermented cocoa beans" as used herein refers to cocoa beans that have been fermented for at least two days.

Cocoa beans disclosed herein are thus rich or depleted on ingredients such as aroma compounds and aroma precursor, ester-precursors, free amino acids, and aromatic bioactive molecules such as polyphenols, linalool, anandamid, cycloartenol and alkaloid compounds such as caffeine, theobromine, and sugars such as sucrose, fructose and carbohydrate such as starch.

In addition, the invention relates to cocoa beans that have an adjustable amount of components such as those enumerated above. The term "adjustable amount" as used herein is intended to refer to the possibility, when carrying out the present method, to obtain a well-defined amount, i.e. concentration or quantity, of components in said cocoa beans.

Cocoa beans according to the invention have well-defined and controllable composition, flavour and/or organoleptic properties, and in particular are high-flavoured cocoa products. Cocoa flavour may be classified according to the following categories: cocoa flavour, acid/sharp, astringent, bitter, raw/green, fragrant/floral, brown fruit, late sour and thick mouthfeel. Scores for cocoa beans according to the invention may be assessed on a point system and a high score in a category indicates a strong intensity for a particular flavour.

The invention provides cocoa beans, in particular non-roasted cocoa beans, having one or more of the following features.

In an embodiment, the invention relates to cocoa beans that have an amount of free amino acids (FAA) selected from the group comprising alanine, phenylalanine, tryptophan, leucine, and valine, and preferably selected from the group comprising alanine, phenylalanine and tryptophan, which is at least 10% higher than in cocoa beans that have been subjected to a fermentation process of at least two days The term "free" in this context refers to amino acids that are not covalently bound to another moiety.

In particular, the invention provides cocoa beans having an amount of phenylalanine which is higher than 2500 ppm, and for instance higher than 3000 ppm or higher than 3500 ppm. In yet another embodiment, the invention relates to cocoa beans having an amount of alanine which is higher than 1200 ppm, or higher than 2200 ppm, and for instance higher than 2400 ppm or higher than 3000 ppm. In another embodiment, the invention provides cocoa beans having an amount of tryptophan which is higher than 350 ppm, and preferably higher than 500 ppm or higher than 900 ppm.

In another embodiment, the invention relates to cocoa beans that have an amount of decarboxylated amino acids such as phenylethylamine (PEA) (i.e. decarboxylated phenylalanine) and/or gamma-aminobutyric acid (GABA) (i.e. decarboxylated glutamic acid), which is at least 10% higher than in cocoa beans that have been subjected to a fermentation process of at least two days.

The invention relates to cocoa beans having an amount of phenylethylamine which is higher or lower, and preferably higher, than an amount comprised 0.02-1.4 ppm. In an embodiment, the invention provides non cocoa beans having an amount of phenylethylamine which is higher than 5 ppm, and for instance higher than 10, 15, 20, 25, or 30 ppm.

In another embodiment, the invention also provides cocoa beans having an amount of gamma-aminobutyric acid which is higher than 500 ppm, and for instance higher than 1000, or higher than 1500 ppm.

In another preferred embodiment, the invention relates to cocoa beans having elevated amounts of alkaloids. In a preferred embodiment, the invention relates to cocoa beans, having an amount of theobromine which is higher or lower than a value between 10000 and 16000 µg/g cocoa beans and preferably which is higher or lower than a value between 10404 and 15606 µg/g cocoa beans and for instance which is higher or lower than a value between 10000 and 16850 µg/g cocoa beans.

In another preferred embodiment, the invention relates to cocoa beans having an amount of polyphenols which is higher or lower than an amount between 2.5-4.5 wt %. Preferably, said polyphenols include epicatechin and catechin. In a preferred embodiment the invention relates to cocoa beans having an amount of epicatechin which is higher than 10000 ppm, and preferably higher than 12500 ppm are provided.

The invention in particular relates to cocoa beans that are obtainable or obtained by a method according to the present invention.

In another aspect, the invention also relates to cocoa products prepared with one or more cocoa beans as defined herein. "Cocoa products" according to the present invention are defined as products that can be prepared using cocoa beans, and may be selected from the group comprising cocoa powder, cocoa extract, cocoa liquor, cocoa mass, cocoa cake, and cocoa butter. Cocoa products can be in a liquid form or in a dry or lyophilized form, such as in the form of granules, pellets, or a powder.

A cocoa product according to the invention can be prepared in a form to be directly administered to an individual, and are preferably formulated for oral consumption. By way of example, a cocoa product according to the invention can be prepared in the form of tablets, chewable tablets, capsules, and liquid syrup.

Cocoa products according to the invention can also be introduced in food products. The high-flavoured cocoa beans according to the invention are particularly suitable for the production of high-flavoured food products.

Advantageously, the present invention permits to provide highly-flavoured cocoa beans and highly-flavoured cocoa products derived therefrom such as e.g. cocoa liquor, cocoa mass, cocoa cake, cocoa powder, cocoa extract, cocoa butter.

Moreover, cocoa beans which have been pre-treated and bioconverted according to the present methods obtain unexpected properties. More in particular, the cocoa beans obtained or obtainable according to the present method are surprisingly easy to process, for example the beans can easily be split into cocoa components, i.e. mass, liquor, powder etc. Further, cocoa beans obtained or obtainable according to the present method retain their flavour and organoleptic properties for a prolonged time.

Food Products and Extracts

In yet another aspect, the invention relates to the use of cocoa beans as defined herein and/or of cocoa products as defined herein for the preparation of food products, preferably chocolate products.

The invention also relates to a food product prepared with one or more cocoa beans as defined herein and/or with one or more cocoa products as defined herein.

The term "food product" is used herein in a broad sense, and covers food for humans as well as food for animals (i.e. a feed). In a preferred aspect, the food is for human consumption. The food may be in the form of a solution or as a solid, depending on the use and/or the mode of application and/or the mode of administration. Non limitative examples of food products which may be obtained using cocoa beans according to the present invention include for instance chocolate products, chocolate drinks, nutritional beverages, beverage powders, milk-based products, ice cream, confectionery, bakery products such as cakes and cake mixes, fillings, cake glaze, chocolate bakery filling, doughnuts, and dairy products. Particularly preferred food products include "chocolate products". Chocolate products preferably comprise one or more components selected from the group comprising cocoa beans or cocoa products according to the invention, sugars, sugar substitutes, milk powders, fat, emulsifier, flavouring agents and mixtures thereof. Preferably, the said cocoa products are selected from cocoa powder, cocoa mass, cocoa liquor, and mixtures thereof, as defined herein. Milk powders include, for example, skimmed milk powder, whey powder and derivatives thereof, full cream milk powder and mixtures thereof. Suitable sugars include sucrose, fructose, glucose and dextrose and mixtures thereof (with sucrose being preferred). Sugar substitutes preferably include inulin, dextrin, isomaltulose, polydextrose and maltitol and mixtures thereof. Fats include butter fat or fractions thereof, palm oil or fractions thereof, coconut or fractions thereof, palm kernel oil or fractions thereof, liquid oils (for example, sunflower oil and/or rapeseed oil), interesterified mixtures of the above fats or fractions or hardened components thereof, or mixtures thereof. Emulsifiers include lecithin, fractionated lecithin and PGPR or mixtures thereof. Flavouring agents include vanilla and caramel or mixtures thereof.

Food products, e.g. chocolate products, comprising cocoa beans or cocoa products derived thereof as defined herein have improved characteristics, including for instance improved storage stability, improved organoleptic properties such as for instance a better flavour profile, better flavour release, prolonged flavor retention and improved appearance, than equivalent products made from cocoa beans that have not been pre-treated in accordance with the present invention.

In another embodiment, the invention encompasses the use of cocoa beans according to the invention for the preparation of cocoa extracts, and to cocoa extracts thereby obtained. For this, cocoa beans according to the invention can be conventionally processed into cocoa extracts according to techniques known in the art.

The present invention will be described in greater detail below with the aid of the examples which follow. It goes without saying, however, that these examples are given by way of illustration of the invention and do not constitute in any manner a limitation thereof.

EXAMPLES

Example 1

Freshly harvested ripe pods were opened and the beans were removed. The beans were depulped.

1 kg of fresh depulped cocoa beans was placed in a vessel. The beans were treated with 600 mM acetic acid (pH 2.6) and the temperature was raised to 41° C. The pH range was monitored and controlled until the internal bean pH value reached approximately 4.4 (duration approximately 3 h). During a first incubation period the pH was kept at approximately 4.4. After 23 hours the aqueous solution was removed. During a second incubation period the beans were treated with 600 mM acetic acid (pH 5.5) for approximately 2 hours. The internal bean pH was kept at approximately pH 5.5.

pH measurements were conducted as follows: at regular intervals during the process 10 g of beans were collected. A 5 g bean mix was brought in 20 ml of water and boiled for 3 minutes at 100° C. The water was filtrated and the pH was measured. FIG. 1 shows the pH evolution of the beans and liquid during the method of the invention.

Figure 2:
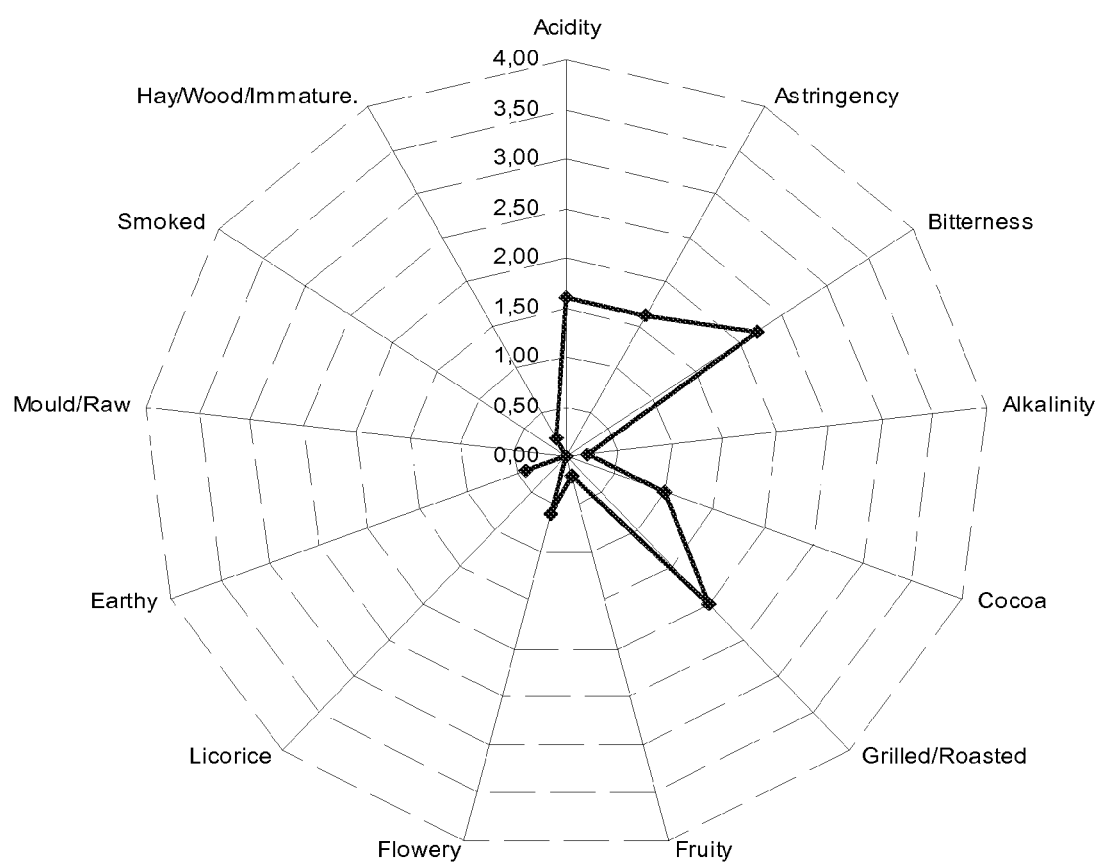
FIG. 2 shows the results of a taste panel conducted in the experiment described in example 1.

The beans prepared as described above, were then dried by evaporation of the water under vacuum during gentle heating, at a temperature below 60° C., until the moisture content was less than 10%. Then the beans were roasted in an oven at 120° C. for 30 min. The flavours generated by the roasting were then evaluated by a panel of individuals used to evaluating such flavours. Scores were assessed on a point system. A high score in a category indicated a strong intensity of a particular flavour. Table 1 and FIG. 2 show the results of a taste panel for the beans as prepared according to this example.

Each sample was evaluated for the following sensations "cocoa flavour" (derived from Ghana beans), "acidity" (qualifies the basic taste generated by dilute aqueous solutions of most acids), "bitterness" (qualifies the basic taste generated by dilute solutions of various substances such as quinine, perceived on the top of the tongue and at the back of the palate), "astringency" (the term has been broadened to the entire actions of polyphenols which result in sensations of a physical nature, from the suppression of unctuousness to the astringency in the medical sense which covers constriction and/or crispation of the tissues), "fruity" (taste note belonging to the bouquet and which evokes a fruit which has reached maturity: apple, banana, pear and the like), "flowery" (corresponds to an olfactory sensation evoking flowers in general: rose, jasmin, hyacinth, lilac and the like), "smoky" (taste and odor of smoked ham; defect resulting in general from drying the cocoa beans after fermentation by means of a wood fire), "musty", and "raw" (feature of insufficiently roasted cocoas where the flavour has not developed; linked to astringency and acidity; "earthy" (corresponds to an olfactory sensation that evokes raw groundnuts).

TABLE 1

West African taste

| Descriptors | Judges | | | | | Average | Standard deviation |
|---|---|---|---|---|---|---|---|
| | 1 | 2 | 3 | 4 | 5 | | |
| Acidity | 1 | 4 | 1 | 1 | 1 | 1.6 | 1.34 |
| Astringency | 1 | 3 | 2 | 2 | 0 | 1.6 | 1.14 |
| Bitterness | 2 | 3 | 2 | 3 | 1 | 2.2 | 0.83 |
| Alkalinity | 0 | 0 | 0 | 1 | 0 | .2 | 0.44 |
| Cocoa | 1 | 1 | 2 | 0 | 1 | 1 | 0.7 |
| Grilled/Roasted | 1 | 1 | 3 | 3 | 2 | 2 | 1 |
| Fruity | 1 | 0 | 0 | 0 | 0 | .2 | 0.44 |
| Flowery | 0 | 1 | 0 | 2 | 0 | .6 | 0.89 |
| Licorice | 0 | 0 | 0 | 0 | 0 | 0 | 1 |
| Earthy | 0 | 2 | 0 | 0 | 0 | .4 | 0.89 |
| Mould/Raw | 0 | 0 | 0 | 0 | 0 | 0 | 1 |
| Smoked | 0 | 0 | 0 | 0 | 0 | 0 | 1 |
| Hay/Wood/Immature | 0 | 0 | 0 | 0 | 1 | .2 | 0.44 |

Example 2

Figure 3:
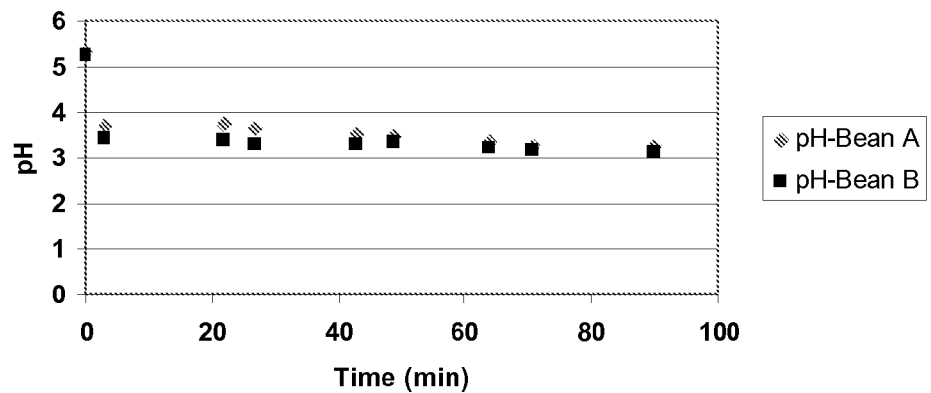
FIG. 3 shows the pH evolution in function of time of cocoa beans of an experiment as described in example 2.

Example 2 illustrates the use of a strong acid such as HCl for pH control. Freshly harvested ripe pods were opened and the beans were removed and depulped. 1 kg of fresh depulped cocoa beans was placed in a vessel. The beans were treated with 1M HCl (pH±1) and the temperature was raised to 41° C. The pH change was observed until the internal bean pH value reached pH±3.6. This pH level was reached after approximately 3 hours. FIG. 3 shows the pH evolution of the beans and liquid during the method of the invention. Beans A and beans B refer to two different samples and illustrating reproducibility of the present method.

This example illustrates the steps a) to c) of the present method and illustrates that a HCL solution can be advantageously used for preparing an aqueous acidic medium in which the cocoa beans can be immersed until their internal pH reaches a value of between 3.6 and 5.5. This example further illustrates that by using a strong acid such as HCl it is possible to more rapidly lower the pH of the cocoa beans then for instance with using a weaker acid such as acetic acid.

Example 3

In this experiment, freshly harvested ripe pods were opened and the beans were removed and depulped. 1 kg of fresh depulped cocoa beans was placed in a vessel. The beans were treated with 400 mM acetic acid (pH 2.6) at 41° C. The change in pH was monitored by regular sampling and measuring as described. After approximately 4 hours the pH reached a value of about 4.6. In a first incubation period the pH was kept at about 4.6 at 41° C. After 20 hours the buffer was changed. For the second incubation period the previous medium was replaced by 1 M NaOH-solution. The aqueous solution and beans were mixed. In less than 1 hour a pH of 5.5 was reached. The internal bean pH was kept at approximately pH 5-5.5.

This example illustrates that by adding a solution of a strong base, i.e. a 1M NaOH solution, to the first incubation medium the pH value inside the cocoa beans can be increased to a suitable value, and in this case brought from pH 4.6 to pH 5 to 5.5.

Example 4

In this experiment, freshly harvested ripe pods were opened and the beans were removed and depulped. 1 kg of fresh depulped cocoa beans was placed in a vessel. The beans were treated with a buffer of 600 mM acetic acid (pH 2.6) at 41° C. The change in pH was monitored by regular sampling and measuring as described in Example 1. After approximately 3 hours the internal bean pH reached about 4.4. The buffer was removed. In a first incubation period the pH was kept at about 4.4 at 41° C. under water saturated conditions. After 23 hours the buffer was changed. A second incubation period was induced using 600 mM acetic acid (pH 5.5) for approximately 2 hours. The internal bean pH was kept at approximately pH 5.5 under water saturated conditions.

Example 5

Freshly harvested ripe pods are opened and the beans are removed. 1 kg of fresh cocoa beans are subjected to a temperature lower than 10° C. for at least 1 minute. This can for instance be done by placing the beans in a freezer.

Then the beans are placed in a vessel. The beans are treated with 600 mM acetic acid (pH 2.6) and the temperature is raised to 41° C. The pH range can be monitored and controlled until the internal bean pH value reaches approximately 4.4 (duration approximately 3 h). During a first incubation period the pH is kept at approximately 4.4. After 23 hours the aqueous solution can be removed. During a second incubation period the beans are treated with 600 mM acetic acid (pH 5.5) for approximately 2 hours. The internal bean pH is kept at approximately pH 5.5. pH measurements of the beans can be conducted as explained in example 1.

The beans can then be dried by evaporation of the water under vacuum during gentle heating, at a temperature below 60° C., until the moisture content is less than 10%. Then the beans are roasted in an oven at 120° C. for 30 min. The flavours can be generated by the roasting can then be evaluated by a panel of individuals used to evaluating such flavours. Scores are usually assessed on a point system. A high score in a category indicates a strong intensity of a particular flavour. Each sample can be evaluated for different sensations as has been explained in example 1.

Example 6

Freshly harvested ripe pods are opened and the beans are removed. 1 kg of fresh cocoa beans are subjected to infra-red radiation of a wavelength between 750 nm and 1 mm for at least 1 minute.

Then the beans are placed in a vessel. The beans are treated with 400 mM acetic acid (pH 2.6) at 41° C. The change in pH can be monitored by regular sampling and measuring as described above. After approximately 4 hours the pH can reach a value of about 4.6. In a first incubation period the pH is kept at about 4.6 at 41° C. After 20 hours the buffer can be changed. For the second incubation period the previous medium is replaced by 1 M NaOH-solution. The aqueous solution and beans are then mixed. In less than 1 hour a pH of 5.5 can be reached. The internal bean pH is then kept at approximately pH 5-5.5.

The beans can then be dried by evaporation of the water under vacuum during gentle heating, at a temperature below 60° C., until the moisture content is less than 10%. Then the beans are roasted in an oven at 120° C. for 30 min. The flavours can be generated by the roasting can then be evaluated by a panel of individuals as described above in example 1.

Example 7

This example illustrates the characteristics of cocoa beans that have been treated using a method for bioconversion according to the invention comprising one immersion step in an acidic medium.

Freshly harvested ripe pods were opened and the cocoa beans were removed. The recovered fresh cocoa beans were mechanically treated by passing through a depulper. By using this depulper, pulp was removed from the cocoa beans and the depulped beans were recovered.

The depulped beans were first treated with 300 mM acetic acid (pH 2.6) at a temperature of 41° C. for 16 hours. Treatment was done under oxygen atmosphere. The pH range was monitored and controlled until the internal bean pH was 4.5. pH measurements were conducted as explained in example 1. After 16 hours the aqueous solution was removed and the obtained beans were sun-dried, until their moisture content was less than 10%.

Then the beans were roasted in an oven at 120° C. for 30 min. The roasted beans were ground and a cocoa liquor was prepared thereof. The flavours generated by the roasting were then evaluated by a panel of five individuals used to evaluating such flavours. Scores were assessed on a point system from 0 to 5. A high score in a category indicated a strong intensity of a particular flavour. Each sample was evaluated for the following sensations: "acidity"; "bitterness"; "astringency"; "chocolate"; "fruity"; "Aromatic"; "wine", "earthy"; "mouldy"; "smoky"; "baggy" (i.e. off flavors). For comparison, the taste panel also tasted liquor that had been prepared from conventionally fermented beans in a similar way as for the cocoa beans obtained in the present example.

Figure 4:
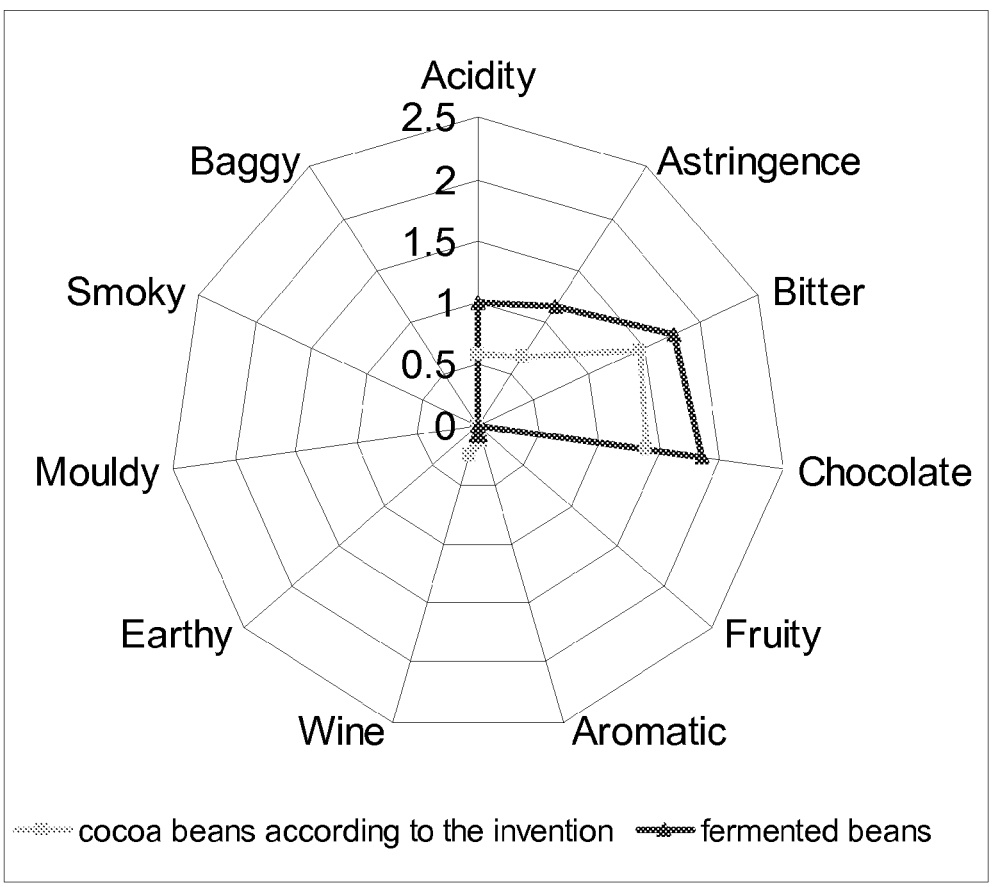
FIG. 4 illustrates the results of a taste panel experiment conducted on samples of pretreated cocoa beans that have been subjected to one immersion step in an acidic medium according to a method of the invention.

FIG. 4 shows the results of the taste panel experiment, and indicates that cocoa beans that have been subjected to a bioconversion process according to the invention provide cocoa liquor with a good and suitable taste. Compared to the conventionally fermented beans, the taste of the liquor according to the invention was clearly less bitter and less astringent.

Example 8

This example illustrates the characteristics of cocoa beans that have been treated using a method for bioconversion according to the invention comprising two immersion steps in an acidic medium.

Freshly harvested ripe pods were opened and the cocoa beans were removed. The recovered fresh cocoa beans were mechanically pre-treated by passed them through a depulper. By using this depulper, pulp was removed from the cocoa beans and the depulped beans were recovered. The depulped beans were first treated with 600 mM acetic acid (pH 2.6) at a temperature of 41° C. for 24 hours. Treatment was done under oxygen atmosphere. The pH range was monitored and controlled until the internal bean pH was 4.5. After 24 hours the aqueous solution was removed. The beans were then again immersed in a solution containing 600 mM sodium acetic buffer and incubated at 41° C. for 12 hours. The internal bean pH increased to a pH of 5.3. pH measurements were conducted as explained in example 1. After the above treatments, the obtained beans were sun-dried, until the moisture content was less than 10%.

Then the cocoa beans were roasted in an oven at 120° C. for 30 min. The roasted beans were ground and a cocoa liquor was prepared thereof. The flavours generated by the roasting were then evaluated by a panel of five individuals used to evaluating such flavours. Scores were assessed on a point system from 0 to 5 for the same flavors as described in example 7.

Figure 5:
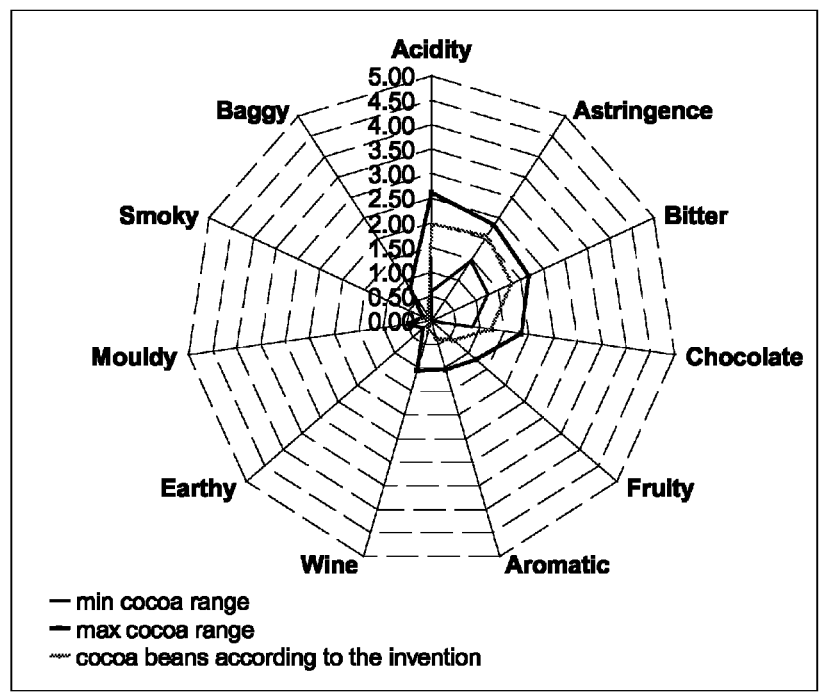
FIG. 5 illustrates the results of a taste panel experiment conducted on samples of pretreated cocoa beans that have been subjected to two immersions step in an acidic medium according to a method of the invention.

According to the objective taste panel, the obtained beans had a "West African Taste". FIG. 5 shows the results of the taste panel experiment, and indicates that the cocoa beans that had been subjected to a bioconversion process obtained a good taste, which felt within the minimum and maximum acceptable cocoa taste ranges.

Examples 7 and 8 indicate that cocoa beans obtained when carrying out a method according to the invention had a reproducible and good quality, and that unexpectedly an acceptable taste and quality could be obtained without having to subject the beans to a microbial fermentation. Moreover, the present cocoa beans were easily and rapidly obtained, i.e. in less than 48 hours, which is considerably faster than when applying a conventional fermentation process.

Example 9

Unfermented cocoa beans that have been pre-treated and subjected to an endogenous bioconversion as described in example 7 were analysed and were compared to (A) dried unfermented cocoa beans; and/or (B) cocoa beans that had been conventionally fermented for 5 days and subsequently dried. Results of these experiments are presented in FIG. 6A to 6E. The illustrated values represent results of analysis carried out on unroasted beans.

FIG. 6A to 6D respectively illustrate that the amount of GABA, phenylalanine, alanine, and tryptophan are much higher in cocoa beans that have undergone a method according to the invention than in unfermented cocoa beans or cocoa beans that have been conventionally fermented for 5 days.

In particular, the levels of GABA obtained in the bioconverted beans were more than three times higher than those obtained in the unfermented or in the fermented beans. The levels of phenylalanine obtained in the bioconverted beans were more than seven times higher than those obtained in the fermented beans and more than 55 times higher than those obtained in the unfermented beans. The levels of alanine obtained in the bioconverted beans were more than three times higher than those obtained in the fermented or the fermented beans. The levels of tryptophan obtained in the bioconverted beans were more than 4 times higher than those obtained in the fermented or the unfermented beans.

Figure 6A:
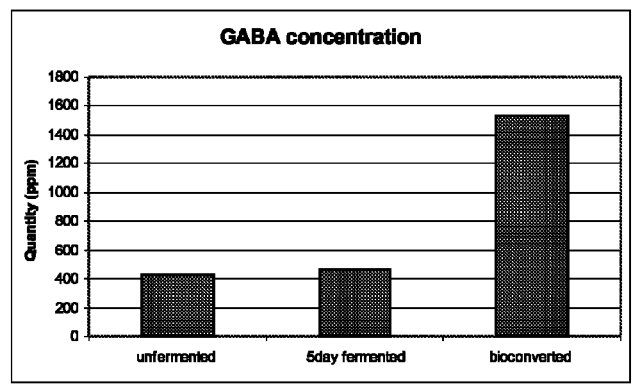
FIG. 6A to 6E illustrates the results of analytical analyses carried out on unfermented cocoa beans, on conventionally fermented cocoa beans and on pretreated cocoa beans that have processed according to a method of the invention.
Figure 6B:
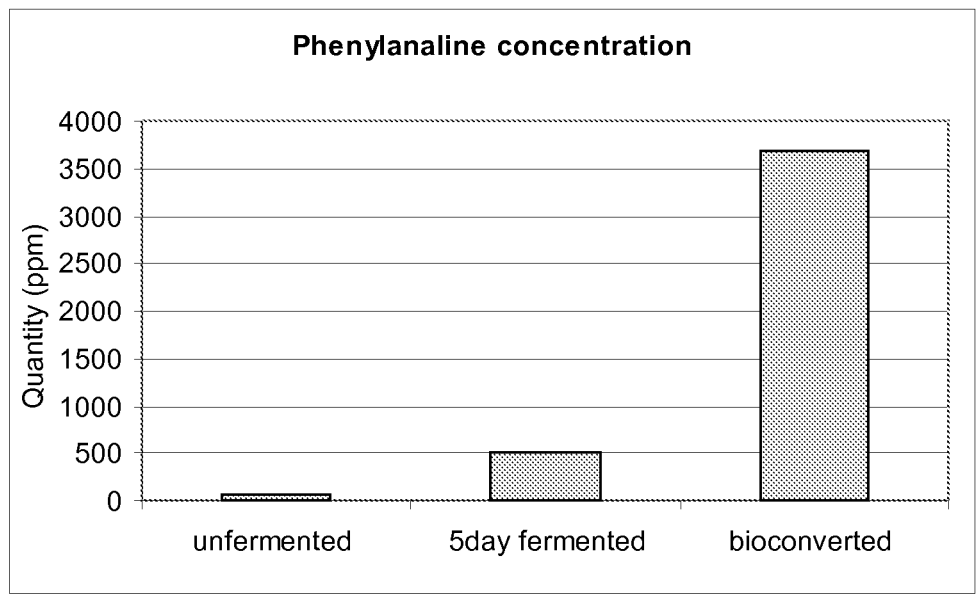
Figure 6C:
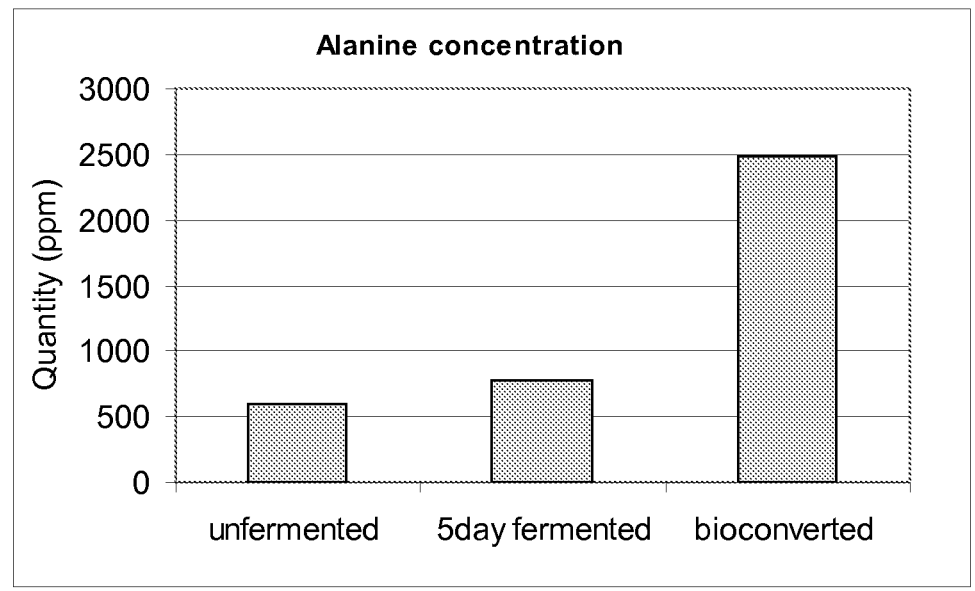
Figure 6D:
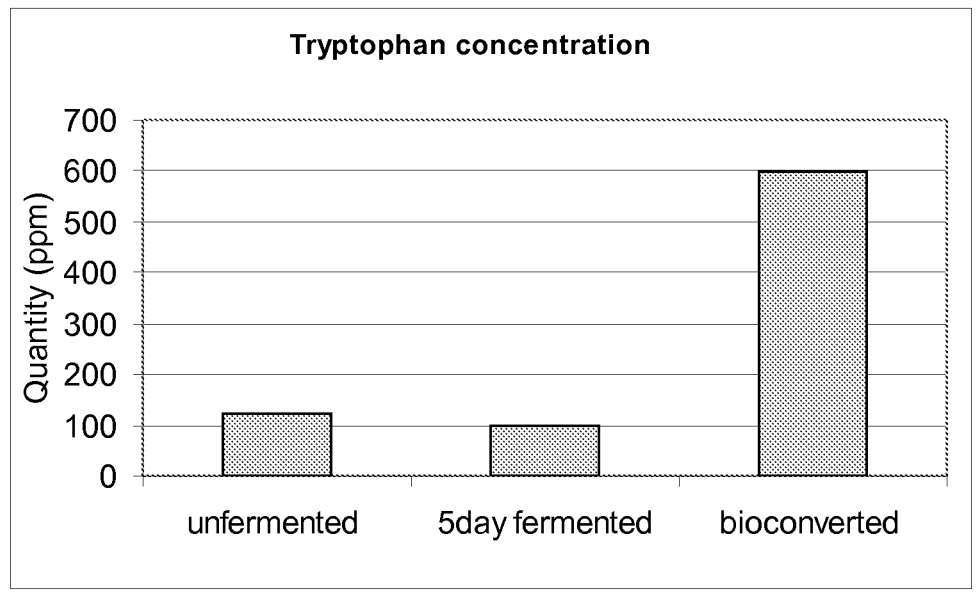
Figure 6E:
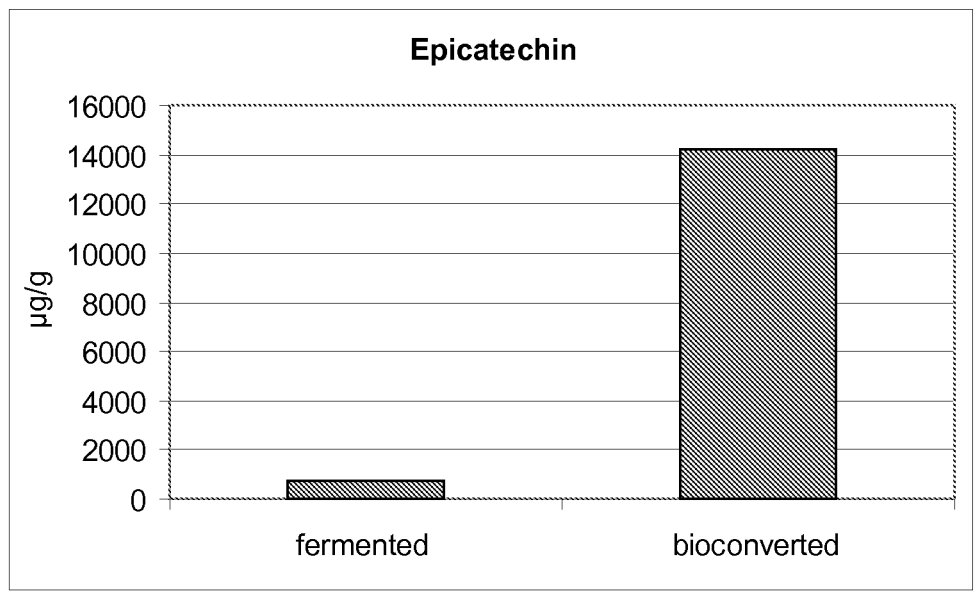

FIG. 6E illustrates that the amount of the polyphenol epicatechin is much higher in cocoa beans that have undergone bioconversion process according to the invention bioconversion than in cocoa beans that have been conventionally fermented for 5 days. The levels of epicatechin obtained in the bioconverted beans were more than 22 times higher than those obtained in the fermented beans. This result further indicates that by applying a method for processing cocoa beans according to the invention, the amount of this health promoting flavanol can be preserved almost completely, as there is no substantial decay compared to a fresh (unfermented) cocoa bean, while during a spontaneous fermentation more then 80% thereof will be lost. The present method hence permits to keep high levels of flavonols, such as epicathecin, in the beans, in contrast to fermented beans, wherein such compounds will generally be degraded.

In addition, the amount of bacteria remaining on dried cocoa beans that were processed according to the present example was compared to the amount of bacteria on fermented cocoa beans (fermented for 5 days) that were dried in a similar way. It was shown that the amount of bacteria on the beans that were processed according to the invention was about 100-550 TPC (total plate count); which is much lower than the amount of 5000 TPC which is usually considered as acceptable. In contrast, the amount of bacteria on the dried fermented cocoa beans was much higher than the acceptable standard or about 5000 TPC, and the latter beans need to undergo a de-bacterisation to remove bacterial contamination before being further processed and/or severely roasted.

This result indicates that the present method for bioconverting unfermented beans permits to obtain less bacterial contamination of the beans and therefore reduces and even may suppress in some cases the need to subject to cocoa beans to a de-bacterization treatment before downprocessing of the beans. Also, the present method for bioconverting unfermented beans permits to roast the beans under less severe conditions, e.g. at lower roasting temperatures and during shorter roasting times, compared to conventionally fermented beans.

Example 10

Unfermented cocoa beans were pretreated mechanically (depulped) and were then cooled for 10 minutes at 4° C. After cooling the beans were placed in a vessel and treated with 600 mM acetic acid (pH 2.6) and the temperature was raised to 41° C. The pH range was monitored and controlled until the internal bean pH value reached approximately 4.4. pH measurements of the beans can be conducted as explained in example 1. After 2 hours the aqueous solution was removed, and the beans were recovered.

The obtained beans were analysed for the presence of different components using HPLC techniques (Column: LiChroCART 250-4 (Lichrospher 100 RP-18, 5 μm—Detection with a Fluorescence-detector, Ex 334 nm, Em 425 nm, column temperature 30° C.). It is noted that the beans were not roasted before subjecting these to the HPLC analysis.

Results of the HPLC analyses are given in Table 2

TABLE 2

| | Component | | | | | | | | | | |
|---|---|---|---|---|---|---|---|---|---|---|---|
| | Asp | Glu | Asn | Ser | Gln | Gly | Thr | Ala | Tyr | GABA | PEA |
| Amount (ppm) | 526 | 1015 | 1316 | 447 | 421 | 150 | 236 | 1220 | 696 | 1734 | 31 |

The invention claimed is:

1. Method for processing cocoa beans comprising the steps of:
   i) subjecting said cocoa beans to a physical pre-treatment, and
   ii) subjecting said pre-treated cocoa beans to at least one treatment with an aqueous acidic medium until the pH of said cocoa beans reaches a value of between 3.6 and 5.5, wherein the beans are incubated in step ii) at a temperature of between 25 and 70° C. for less than 24 hours;
   wherein said physical treatment comprises subjecting said cocoa beans to a microwave radiation of 300 MHz to 300 GHz for at least 1 minute or wherein said physical treatment comprises exposing said cocoa beans to infra-red radiation of a wavelength of between 750 nm and 1 mm for at least 1 minute.

2. Method according to claim 1, wherein the cocoa beans treated in step i) are unfermented and non-depulped cocoa beans.

3. Method according to claim 1, wherein steps i) and ii) are performed under aerobic conditions.

4. Method according to claim 1 comprising the step of releasing polyphenols from said cocoa beans to said medium within two hours of subjecting said cocoa beans to step ii).

5. Method according to claim 1 comprising inhibiting the germination of at least 80% of said cocoa beans within two hours of subjecting said cocoa beans to step i).

6. Method according to claim 1 wherein the cocoa beans are further subjected to a mechanical treatment in step i) and, wherein said mechanical treatment is selected from the group comprising depulping, scoring, scraping, cracking, crushing, pressing, rubbing, centrifugation, cutting or perforation of the cocoa beans and any combinations thereof.

7. Method according to claim 1, wherein step ii) comprises the steps of:
   a) immersing the pre-treated cocoa beans within an aqueous acidic medium until the pH of said cocoa beans reaches a value of between 4.0 and 5.5,
   b) optionally removing the aqueous acidic medium of step a),
   c) incubating the cocoa beans of step a) or of step b) at a temperature of between 25 and 70° C. for less than 24 hours, and
   d) optionally washing the cocoa beans of step c).

8. Method according to claim 7 comprising the step of drying the cocoa beans obtained in step c) or step d).

9. Method according to claim 7 wherein said aqueous acidic medium applied in step a) is a solution having a pH lower than 5.

10. Method according to claim 7, wherein the cocoa beans are immersed in step a) in an aqueous acidic medium of at least 0.1 molar (M) containing acetic acid.

11. Method according to claim 1, wherein step ii) comprises the steps of
   a) immersing said pre-treated cocoa beans within an aqueous acidic medium until the pH of said cocoa beans reaches a value of between 3.6 and 5.5,
   b) optionally removing the aqueous acidic medium of step a),
   c) incubating the cocoa beans of step a) or of step b) at a temperature of between 25 and 70° C. for less than 24 hours,
   d) optionally washing the cocoa beans of step c),
   e) immersing the cocoa beans of step c) or of step d) within an aqueous acidic medium or alkalifying the aqueous acidic medium of step a) until the pH of said cocoa beans reaches a value of between 4.5 and 6.5,
   f) optionally removing the aqueous acidic medium of step e),
   g) incubating the cocoa beans of step e) or of step f) at a temperature of between 25 and 70° C. for less than 24 hours, h) optionally washing the cocoa beans of step g), and i) optionally drying the cocoa beans of step g) or h).

12. Method according to claim 11 wherein said aqueous acidic medium applied in step e) is a solution having a pH lower than 6.5.

13. Method according to claim 11, wherein the cocoa beans are immersed in step e) in an aqueous acidic medium of at least 0.1 molar (M) containing acetic acid.

14. Method according to claim 7, wherein the quantitative ratio of cocoa beans (g dry matter) to the volume of medium (ml) in steps a) and/or e) is between 1:10 and 10:1.

15. Method according to claim 11, wherein the quantitative ratio of cocoa beans (g dry matter) to the volume of medium (ml) in steps a) and/or e) is between 1:10 and 10:1.

16. Method according to claim 1, wherein the cocoa beans obtained in step ii) have an amount of components selected from the group comprising aroma compounds, aroma precursor, ester-precursors, free amino acid precursors, free amino acids, aromatic bioactive molecules, alkaloid compounds, sugars, carbohydrates, and enzymes which is at least 10% higher or at least 10% lower than the amount in the cocoa beans that have been subjected to a conventional fermentation process for at least two days.

17. Cocoa beans having an amount of phenylethylamine (PEA) which is higher than 5 ppm, having an amount of Gamma-aminobutyric acid (GABA) which is higher than 500 ppm, having an amount of phenylalanine (PRE) which is higher than 2500 ppm, having an amount of alanine (ALA) which is higher than 1200 ppm, having an amount of tryptophan (TRP) which is higher than 350 ppm, and having an amount epicatechin which is higher than 10000 ppm.

18. Cocoa beans according to claim 17, which are no longer able to germinate two hours after having been subjected to a mechanical and/or physical treatment.

19. Cocoa beans according to claim 17 wherein said cocoa beans are non-roasted cocoa beans.

20. A cocoa product selected from the group comprising cocoa powder, cocoa extract, cocoa liquor, cocoa mass, cocoa butter and cocoa cake comprising the cocoa bean of claim 17.

21. A food product, preferably chocolate products, comprising the cocoa bean of claim 17.

22. Cocoa product selected from the group comprising cocoa powder, cocoa extract, cocoa liquor, cocoa mass, cocoa butter and cocoa cake, prepared with one or more cocoa beans according to claim 17.

* * * * *